United States Patent Office 3,201,424
Patented Aug. 17, 1965

3,201,424
DERIVATIVES OF 1,3,11,12-TETRAHYDROXY-NAPHTHACENE AND 1,3,6,11 - TETRAHYDROXYNAPHTHACENE-5,12-QUINONE
Jerry Robert Daniel McCormick, Spring Valley, and Jules Reichenthal, Brooklyn, N.Y., assignors to American Cyanamid Company, Stamford, Conn., a corporation of Maine
No Drawing. Filed Oct. 29, 1962, Ser. No. 233,944
13 Claims. (Cl. 260—351)

This invention relates to new organic compounds and, more particularly, is concerned with novel substituted 1,3,11,12-tetrahydroxynaphthacenes and to methods of preparing these novel compounds. The novel substituted 1,3,11,12-tetrahydroxynaphthacenes of the present invention may be represented by the following general formula:

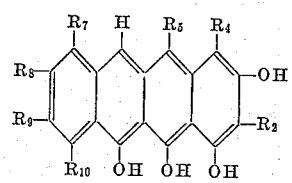

wherein $R_2$ is hydrogen, carboxamido or N-(lower alkyl)-carboxamido, $R_4$ is hydrogen or dimethylamino, $R_5$ is hydrogen, lower alkoxy or lower alkyl and $R_7$, $R_8$, $R_9$ and $R_{10}$ are each selected from the group consisting of hydrogen, halogen, hydroxy, lower alkoxy, lower alkyl, amino, mono(lower alkyl)amine, di(lower alkyl)amino, nitro, nitroso, thiocyano and mercapto. Lower alkyl and lower alkoxy groups contemplated by the present invention are those having from 1 to 6 carbon atoms. Halogen is exemplified by chlorine, bromine, iodine and fluorine.

For convenience, 1,3,10,11,12-pentahydroxynaphthacene-2-carboxamide has been designated by us as "Pretetramid." Thus, the novel compounds of the present invention may be conveniently named as derivatives of "Pretetramid." For example, 6-methyl-1,3,10,11,12-pentahydroxynaphthacene-2-carboxamide, 7-chloro-1,3,10,11,12-pentahydroxynaphthacene-2-carboxamide, 4-dimethylamino-1,3,10,11,12-pentahydroxynaphthacene-2-carboxamide, and 1,3,11,12 - tretrahydroxynaphthacene - 2-carboxamide may be more conveniently referred to as 6-methylpretetramid, 7-chloropretetramid, 4-dimethylaminopretetramid, and 10-deoxypretetramid, respectively.

The novel compounds of the present invention are obtainable as crystalline materials having characteristic absorption spectra and high melting points. They are generally insoluble in water and most organic solvents.

The novel compounds of the present invention may be readily prepared in a variety of different ways. For example, the condensation of an appropriately substituted phthalic anhydride with an appropriately substituted 1,3-dihydroxynaphthalene gives rise either to an intermediate 6-hydroxynaphthacene-5,12-quinone or to an intermediate naphthacene-6,11-quinone as set forth in the following reaction scheme:

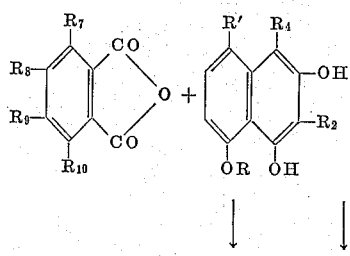

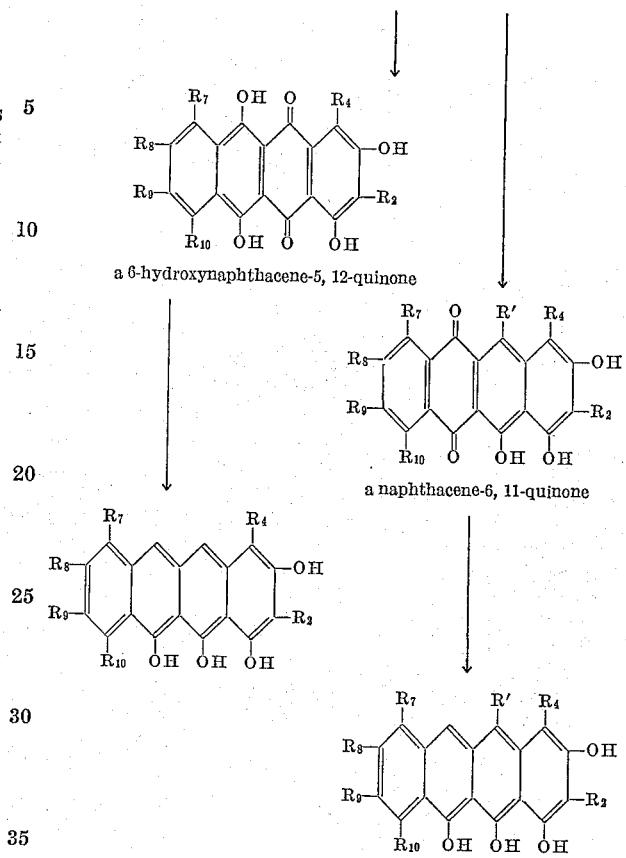

wherein $R_2$, $R_4$, $R_7$, $R_8$, and $R_9$ and $R_{10}$ are as previously defined and R is hydrogen or lower alkyl. When R' is hydroxy or lower alkoxy, then the intermediate 6-hydroxynaphthacene-5,12-quinone is obtained. When R' is hydrogen or lower alkyl, then the product is a naphthacene-6,11-quinone. This condensation is carried out under the general conditions of the Friedel-Crafts reaction employing, for example, boric anhydride, sulfuric acid, anhydrous aluminum chloride or anhydrous ferric chloride as catalyst. The condensation may be carried out in a high boiling inert solvent, or in a melt such as boric anhydride or the eutectic of sodium chloride and aluminum chloride at temperatures in excess of 100° C. Reduction of the resulting naphthacenequinones to the corresponding 5,6-deoxygenated derivatives may be readily accomplished by any of several well-known procedures described in the chemical literature for the reduction of 1-hydroxyanthraquinones to the corresponding 9-anthrones. For example, this reduction may be accomplished with boiling hydriodic acid, with tin and hydrochloric acid, or by catalytic hydrogenation with a nickel or noble metal catalyst.

The novel compounds of the present invention may also be prepared by the condensation of an appropriately substituted naphthalene with an appropriately substituted 3,5-dihydroxyphthalic anhydride as set forth in the following reaction scheme:

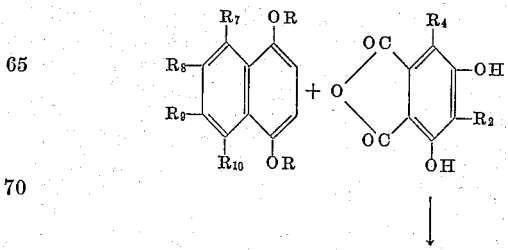

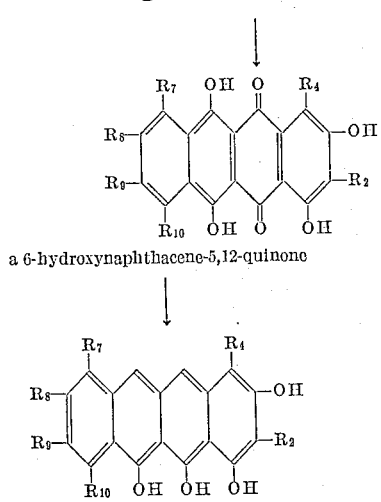

a 6-hydroxynaphthacene-5,12-quinone wherein $R_2$, $R_4$, $R_7$, $R_8$, $R_9$, and $R_{10}$ are as previously defined and R is hydrogen or lower alkyl. This condensation may also be carried out under the general conditions of the Friedel-Crafts reaction as described above, and reduction of the intermediate 6-hydroxynaphthacene-5-12-quinones may also be accomplished as set forth above. In preparing the novel compounds of the present invention by the condensation reactions set forth above, it is to be understood that the substituted phthalic acids, esters, and acid halides are equivalent to the corresponding substituted phthalic anhydrides.

The novel compounds of the present invention are useful as intermediates in the synthesis of physiologically active antibiotics of the tetracycline series. For example, the substituted 1,3,11,12-tetrahydroxynaphthacenes of the present invention may be biologically transformed to tetracyclines as set forth in the following reaction scheme:

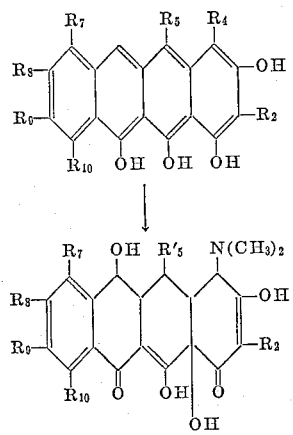

wherein $R_2$, $R_4$, $R_5$, $R_7$, $R_8$, $R_9$ and $R_{10}$ are as previously defined and $R'_5$ is hydrogen, hydroxy, lower alkoxy, or lower alkyl. This transformation is accomplished by adding a substituted pretetramid, or pretetramid itself, to a fermentation medium inoculated with a strain of a species of the genus Streptomyces which species is capable of producing one of the tetracyclines. Certain other biological transformations may be accomplished simultaneously with the 5a,6- and 4a,12a-dihydration of the pretetramids. For example, where $R_4$ in the reaction scheme set forth above is hydrogen, then any of the above indicated Streptomyces will introduce a dimethylamino group at the 4-position of the pretetramid. Where $R_4$ is dimethylamino, then this substituent is retained at the 4-position regardless of the biological transformations occurring in the rest of the pretetramid molecule. Where $R_5$ in the above reaction scheme is hydrogen and a 5-hydroxylating species of the genus Streptomyces is employed, then a hydroxyl group is introduced at the 5-position. Where $R_5$ is lower alkyl, or where $R_5$ is hydrogen and a non-5-hydroxylating species of the genus Streptomyces is employed, then $R'_5$ is lower alkyl or hydrogen, respectively. Where $R_7$ in the above reaction scheme is a substituent other than hydrogen, then this substituent is retained at the 7-position regardless of the biological transformations occurring in the rest of the pretetramid molecule. Where $R_7$ is hydrogen, and a non-halogenating strain of Streptomyces is employed, then $R_7$ is also hydrogen in the product. Where $R_7$ in the pretetramid molecule is hydrogen, and a 7-halogenating strain of the genus Streptomyces is employed, then $R_7$ in the product is chlorine or bromine depending upon the conditions of the fermentation. Among the strains of S. aureofaciens which will introduce chlorine or bromine at the 7-position of the pretetramid molecule, as well as accomplishing the 5a,6- and 4a,12a-dihydration and the introduction of the dimethylamino group when $R_4$ is hydrogen, are the following:

S. aureofaciens:
ATCC 10762a
ATCC 10762b
ATCC 10762g
ATCC 10762i
ATCC 11989
ATCC 12416b
ATCC 12416c
ATCC 12416d
ATCC 12551
ATCC 12552
ATCC 12553
ATCC 12554
ATCC 13189
ATCC 13899
ATCC 13900
NRRL B-1286
NRRL B-1287
NRRL B-1288
NRRL 2209
NRRL B-2406
NRRL B-2407
NRRL 3013

A representative strain of the genus Streptomyces in which is a non-halogenating strain, that is, which will not introduce halogen at the 7-position of the pretetramid molecule, but which will accomplish the 5a,6a- and 4a,12a-dihydration and the introduction of the dimethylamino group when $R_4$ is hydrogen, is S. aureofaciens NRRL 3014. Representative strains of the genus Streptomyces which are non-halogenating strains but which will introduce a hydroxy group at the 5-position of the pretetramid molecule, in addition to accomplishing the 5a,6- and 4a,12a-dihydration and the introduction of the 4-dimethylamino group when $R_4$ is hydrogen, are S. rimosus NRRL 2234 S. platenis NRRL 2364 and S. hygroscopicus NRRL 3015.

Representative pretetramids which may be biologically transformed by the method of the present invention with a non-halogenating strain of the genus Streptomyces are, for example, pretetramid and 4-dimethylaminopretetramid whereby there is obtained 6-demethyltetracycline in both cases. Representative pretetramids which may be biologically transformed by the method of the present invention with a 7-halogenating strain of the genus Streptomyces are, for example, pretetramid and 4-dimethylaminopretetramid whereby there is obtained 7-chloro-6-demethyltetracycline in both cases.

The conditions of the fermentation for the biological conversion of the pretetramids to tetracyclines are generally the same as set forth in U.S. Patent 2,482,055 to Duggar, U.S. Patent 2,734,018 to Minieri et al. and U.S. Patent 2,872,289 to McCormick et al. and which, in turn, are generally the same as for the presently known methods for producing various tetracyclines by fermentation. That is, the fermentation medium contains the usual nutrients and mineral substances. Suitable nutrients include any assimilable source of carbon, such as the polysaccharides or starches, or polyalcohols such as glycerol may be used. An assimilable source of nitrogen may be supplied through the use of proteins, protein hydrolysates, urea, corn steep liquor, meat extracts, peptone, distillers solubles, fish meal and other conventional substances. The common anions and cations are supplied in the form of their non-toxic salts. Trace elements such as manganese, cobalt, zinc, copper, etc., are obtained either as impurities in the above compounds, or through the use of tap water or by specifically adding solutions especially enriched with these trace elements.

The other general conditions of the fermentation such as hydrogen ion concentration, temperature, time rate of aeration, preparation of the inoculum, sterilization, inoculation and the like are conventional and are similar to those for the production of other tetracyclines as set forth in the aforementioned U.S. patents to Duggar, Minieri et al. and McCormick et al.

When a 7-halogenating strain of the genus Streptomyces is employed with a pretetramid wherein $R_7$ is hydrogen, it is necessary only to modify the fermentation medium so that it contains at least 10 parts per million and preferably 1000–1500 parts per million of chloride ions when the 7-chloro substituent is desired, or a like amount of bromide ions when the 7-bromo substituent is desired.

After the fermentation has been continued for a suitable time, for example, from 12 to 96 hours, and the transformation of the pretetramid compound to the desired tetracycline is substantially complete, the tetracycline product may be isolated from the fermentation mash in any convenient manner. The isolation process may be selected from any of the numerous isolation techniques now well known in the art.

The pretetramid starting material may be added at any desired concentration, although for practical reasons a pretetramid substrate at a concentration of up to about 10 grams per liter of medium is satisfactory although higher concentrations may be used with some sacrifice in yield. The addition of the pretetramid starting material may be accomplished in any suitable manner so long as it promotes contact of the pretetramid with the biological medium. To this end, it is preferred to add the pretetramid starting material in a solvent such as dimethylformamide, dimethylacetamide, dimethylsulfoxide, tetramethylenesulfoxide and N-methylpyrrolidone. However, dimethylsulfoxide is preferred and a solution of magnesium acetate in dimethylsulfoxide is the most preferred solvent for the pretetramid starting material. Solutions of the pretetramids must be protection from air as the compounds are readily oxidized in solution.

The invention will be described in greater detail in conjunction with the following specific examples.

EXAMPLE 1

Synthesis of 10-deoxypretetramid

To 263 mg. of 1,3-dihydroxy-5,8-dimethoxynaphthalene-2-carboxamide was added 296 mg. of phthalic anhydride, 2 gm. of sodium chloride and 10 gm. of anhydrous aluminum chloride. The solids were mixed thoroughly in a mortar and added to a flask which was set in an oil bath preheated to 200° C. The reaction was allowed to proceed for 2 hours. The melt was allowed to cool and was then digested cautiously with 50 ml. of 6 N HCl on a steam bath. The crude 1,3,6,11-tetrahydroxy-naphthacene-5,12-quinone-2-carboxamide was collected by filtration, washed and then dried under vacuum. The yield was about 440 mg. This crude quinone was then purified by extraction into chloroform from a dimethylformamide-water-triethylamine solution. The yield was about 150 mg. which was dissolved in 5 ml. of p-chlorophenol. To this was added 2 ml. of constant boiling hydriodic acid and 200 mg. of dibasic potassium hypophosphite. This mixture was refluxed for 5 hours. The mixture was allowed to cool and then filtered. The crystalline 10-deoxypretetramid was washed with water, acetone and then ether and dried under vacuum. The yield was 97 mg.

EXAMPLE 2

Synthesis of pretetramid

To 615 mg. of 1,3-dihydroxy-5,8-dimethoxy-naphthalene-2-carboxamide was added 385 mg. of 3-hydroxyphthalic anhydride, 2 grams of sodium chloride and 10 grams of anhydrous aluminum chloride. The solids were mixed thoroughly in a mortar and added to a flask which was set in an oil bath preheated to 200° C. The reaction was allowed to proceed for 2 hours. The melt was allowed to cool and was then digested cautiously with 50 ml. of 6 N HCl on a steam bath. The crude 1,3,6,10,11-pentahydroxynaphthacene-5,12-quinone - 2 - carboxamide was collected by filtration, washed and then dried under vacuum. This crude quinone was then purified by extraction into chloroform from a dimethylformamide-water-triethylamine solution. The yield was about 172 mg. of 1,3,6,10,11-pentahydroxynaphthacene-5,12-quinone-2-carboxamide. This purified quinone was dissolved in 5 ml. of p-chlorophenol. To this was added 2 ml. of constant boiling hydriodic acid and 200 mg. of potassium hypophosphite. This mixture was refluxed for 5 hours, allowed to cool and then filtered. The crystalline pretetramid was washed with water, acetone, and then ether and dried under vacuum. The yield was 97 mg. of pretetramid.

EXAMPLE 3

Synthesis of 10-deoxy-N-methylpretetramid

To 277 mg. of N-methyl-1,3-dihydroxy-5,8-dimethoxy-naphthalene-2-carboxamide was added 296 mg. of phthalic anhydride, 2 grams of sodium chloride and 10 grams of anhydrous aluminum chloride. The procedure was exactly the same as described in Example 1 resulting in a yield of 272 mg. of N-methyl-1,3,6,11-tetrahydroxy-naphthacene-5,12-quinone-2-carboxamide. 150 milligrams of this purified quinone was reduced exactly as described in Example 1, resulting in a yield of 99 mg. of the reduction product, 10-deoxy-N-methylpretetramid.

EXAMPLE 4

Synthesis of N-methylpretetramid

To 277 mg. of N-methyl-1,3-dihydroxy-5,8-dimethoxy-naphthalene-2-carboxamide was added 164 mg. of 3-hydroxyphthalic anhydride, 2 grams of sodium chloride and 10 grams of anhydrous aluminum chloride. The procedure was exactly the same as described in Example 1 resulting in a yield of 100 mg. of N-methyl-1,3,6,10,11-pentahydroxynaphthacene - 5,12-quinone-2-carboxamide and 56 mg. of the reduction product, N-methylpretetramid.

EXAMPLE 5

Synthesis of 10-deoxy-2-decarboxamidopretetramid

To 292 mg. of the ethyl ester of 1,3-dihydroxy-5,8-dimethoxynaphthalene-2-carboxylic acid was added 296 mg. of phthalic anhydride, 2 grams of sodium chloride and 10 grams of anhydrous aluminum chloride. The procedure was exactly the same as described in Example 1. Cleavage of the ethyl ester and decarboxylation occurred during the condensation and reduction steps resulting in a yield of 68 mg. of the reduction product, 2-decarboxamido-10-deoxypretetramid.

EXAMPLE 6

Synthesis of 2-decarboxamidopretetramid

To 292 mg. of the ethyl ester of 1,3-dihydroxy-5,8-dimethoxynaphthalene-2-carboxylic acid was added 328 mg. of 3-hydroxyphthalic anhydride, 2 grams of sodium chloride and 10 grams of anhydrous aluminum chloride. The procedure was exactly the same as described in Example 1.

Again, ester cleavage and decarboxylation occurred during the preparative reactions resulting in a yield of 93 mg. of the reduction product, 2-decarboxamidopretetramid.

EXAMPLE 7

*Synthesis of 7-hydroxypretetramid*

To 264 mg. of 1,3-dihydroxy-5,8-dimethoxynaphthalene-2-carboxamide was added 402 mg. of 3,6-dihydroxyphthalic acid, 2 gm. of sodium chloride and 10 gm. of anhydrous aluminum chloride. The solids were mixed thoroughly in a mortar and added to a flask which was set in an oil bath preheated to 200° C. The reaction was allowed to proceed for 30 minutes. The melt was allowed to cool and was then digested cautiously with 50 ml. of 6 N HCl on a steam bath. The crude 1,3,6,7,10,11-hexahydroxynaphthacene - 5,12 - quinone-2-carboxamide was collected by filtration, washed and then dried under vacuum. The crude quinone was then purified by extraction with a 1% solution of triethylamine in tetrahydrofuran. The yield was about 358 mg. This purified quinone was dissolved in 5 ml. of p-chlorophenol. To this was added 2 ml. of constant boiling hydriodic acid and 200 mg. of dibasic potassium hypophosphite. This mixture was refluxed for 5 hours, allowed to cool and then filtered. The crystalline 7-hydroxypretetramid was washed with water, acetone and then ether and dried under vacuum. The yield was 147 mg.

EXAMPLE 8

*Synthesis of 7-hydroxypretetramid*

To 269 mg. of 1,3-dihydroxy-5,8-dimethoxynaphthalene-2-carboxamide was added 449 mg. of 3,6-diacetoxyphthalic anhydride, 2 gm. of sodium chloride and 10 gm. of anhydrous aluminum chloride. The procedure of Example 7 was followed resulting in a yield of 20 mg. of the crude quinone which was then reduced to 7-hydroxypretetramid.

EXAMPLE 9

*Synthesis of 8-hydroxypretetramid*

To 263 mg. of 1,3-dihydroxy-5,8-dimethoxynaphthalene-2-carboxamide was added 400 mg. of 3,5-dimethoxyphthalic acid, 2 gm. of sodium chloride and 10 gm. of anhydrous aluminum chloride. The procedure of Example 7 was followed resulting in a yield of 425 mg. of crude 1,3,6,8,10,11-hexahydroxynaphthacene - 5,12 - quinone-2-carboxamide and a yield of 180 mg. of the purified quinone which was then reduced to 8-hydroxypretetramid.

EXAMPLE 10

*Synthesis of 9-hydroxypretetramid*

To 263 mg. of 1,3-dihydroxy-5,8-dimethoxynaphthalene-2-carboxamide was added 384 mg. of 3,4-dimethoxyphthalic acid, 2 gm. of sodium chloride and 10 gm. of anhydrous aluminum chloride. The procedure of Example 7 was followed resulting in a yield of 243 mg. of the 1,3,6,9,10,11-hexahydroxynaphthacene-5,12-quinone-2-carboxamide and a yield of 91 mg. of 9-hydroxypretetramid.

EXAMPLE 11

*Synthesis of 9-hydroxypretetramid*

To 266 mg. of 1,3-dihydroxy-5,8-dimethoxynaphthalene-2-carboxamide was added 400 mg. of 3,4-dimethoxyphthalic anhydride, 2 gm. of sodium chloride and 10 gm. of anhydrous aluminum chloride. The procedure of Example 2 was followed resulting in a yield of 452 mg. of crude quinone and 122 mg. of purified quinone which was then reduced to 9-hydroxypretetramid.

What is claimed is:

1. A compound of the formula:

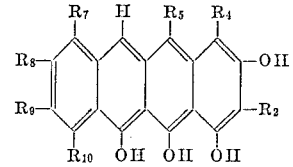

wherein $R_2$ is selected from the group consisting of hydrogen, carboxamido and N-(lower alkyl)carboxamido, $R_4$ is selected from the group consisting of hydrogen and dimethylamino, $R_5$ is selected from the group consisting of hydrogen, lower alkoxy and lower alkyl, and $R_7$, $R_8$, $R_9$ and $R_{10}$ are each selected from the group consisting of hydrogen, halogen, hydroxy, lower alkoxy, lower alkyl, amino, mono(lower alkyl)amino, di(lower alkyl)amino, nitro, nitroso, thiocyano and mercapto.

2. A compound selected from the group consisting of those of the formula:

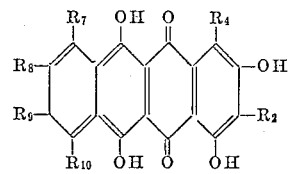

wherein $R_2$ is selected from the group consisting of hydrogen, carboxamido and N-(lower alkyl)carboxamido, $R_4$ is selected from the group consisting of hydrogen and dimethylamino, and $R_7$, $R_8$, $R_9$ and $R_{10}$ are each selected from the group consisting of hydrogen, halogen, hydroxy, lower alkoxy, lower alkyl, amino, mono(lower alkyl)amino, di(lower alkyl)amino, nitro, nitroso, thiocyano and mercapto, and tautomers thereof.

3. 1,3,6,11-tetrahydroxynaphthacene-5,12 - quinone - 2-carboxamide.

4. 1,3,6,10,11-pentahydroxynaphthacene-5,12 - quinone-2-carboxamide.

5. 1,3,11,12-tetrahydroxynaphthacene-2-carboxamide.

6. 1,3,10,11,12-pentahydroxynaphthacene-2-carboxamide.

7. N-methyl-1,3,11,12-tetrahydroxynaphthacene-2 - carboxamide.

8. N-methyl-1,3,10,11,12-pentahydroxynaphthacene-2-carboxamide.

9. 1,3,11,12-tetrahydroxynaphthacene.

10. 1,3,10,11,12-pentahydroxynaphthacene.

11. 1,3,7,10,11,12-hexahydroxynaphthacene-2 - carboxamide.

12. 1,3,8,10,11,12-hexahydroxynaphthacene-2-carboxamide.

13. 1,3,9,10,11,12-hexahydroxynaphthacene-2-carboxamide.

References Cited by the Examiner

UNITED STATES PATENTS 3,074,975  1/63  McCormick et al. ____ 260—559 X

OTHER REFERENCES

Chemical Abstracts, vol. 55, No. 5, pp. 4455-6 (1961).

NICHOLAS S. RIZZO, *Primary Examiner.*